Nov. 12, 1946.  W. T. STEPHENS  2,411,119
STEERING MECHANISM
Filed May 18, 1943  4 Sheets-Sheet 1

Inventor
WILLIAM T. STEPHENS
By Leech & Radue, Attorneys

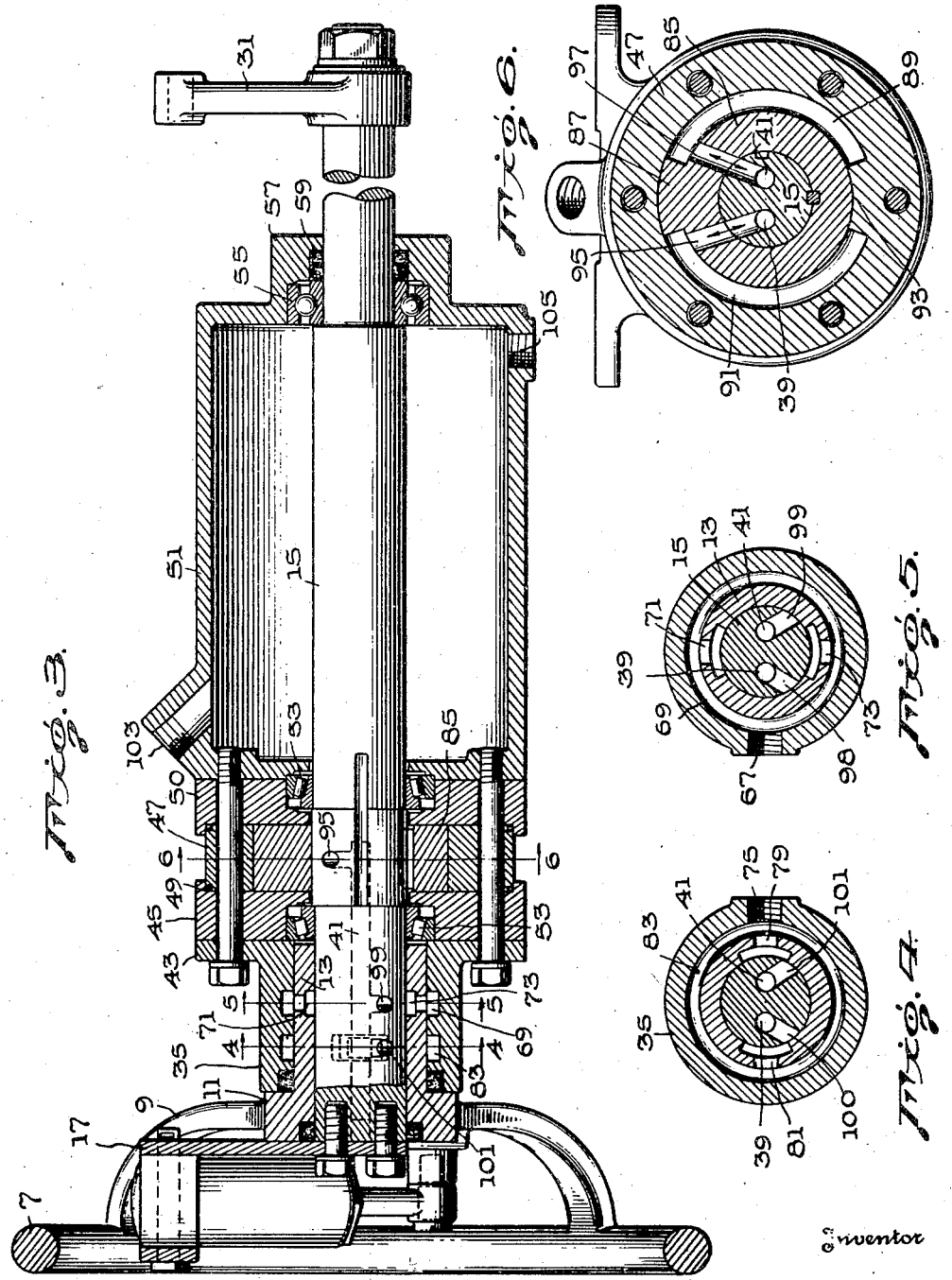

Nov. 12, 1946.  W. T. STEPHENS  2,411,119
STEERING MECHANISM
Filed May 18, 1943  4 Sheets-Sheet 3
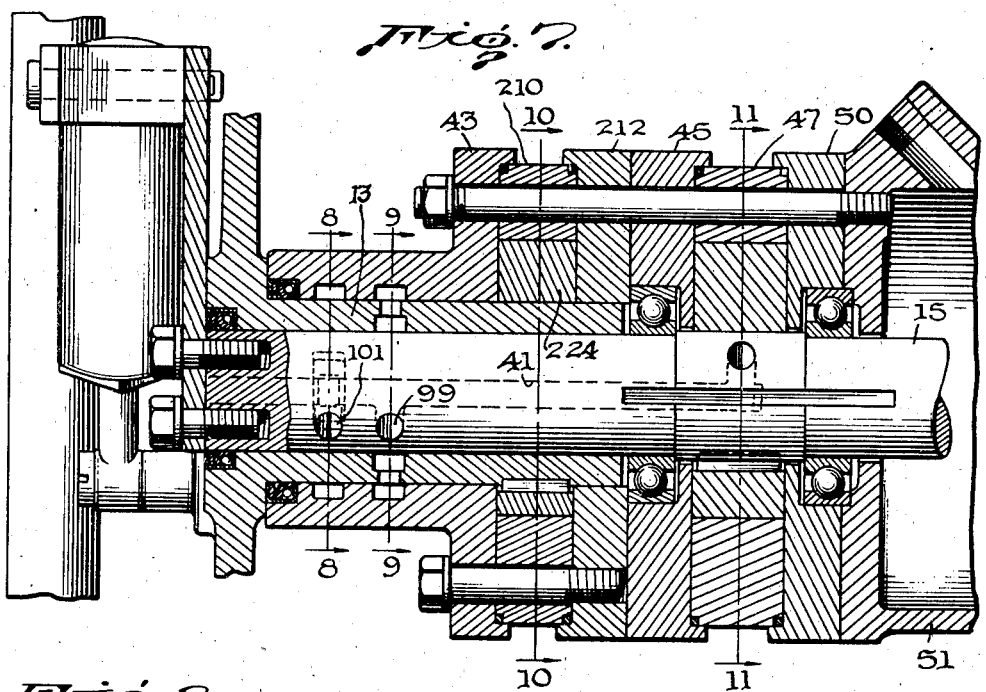
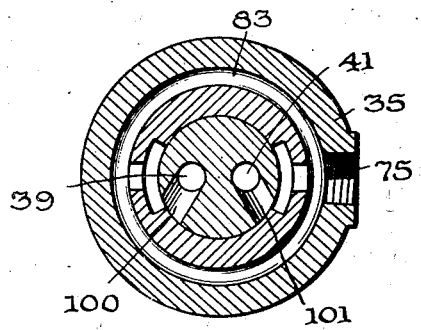
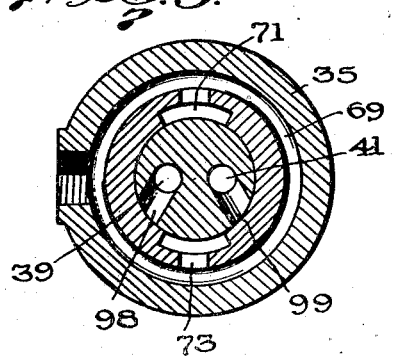
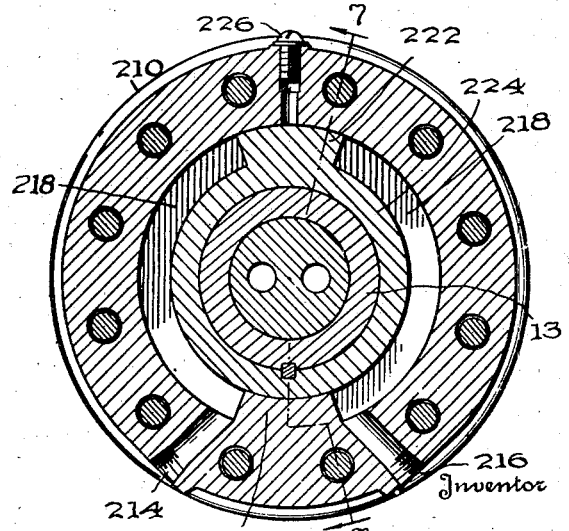
WILLIAM T. STEPHENS

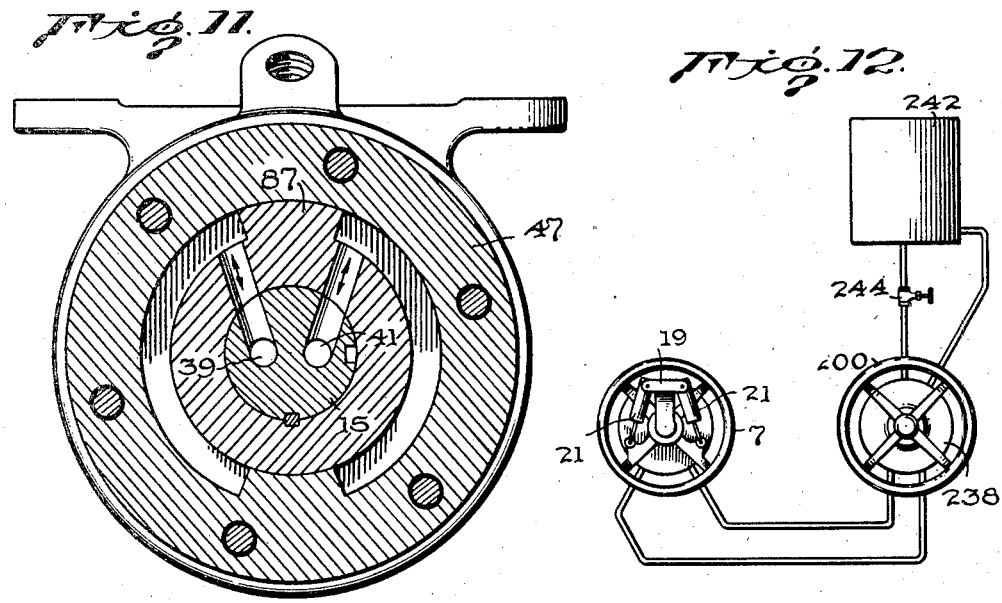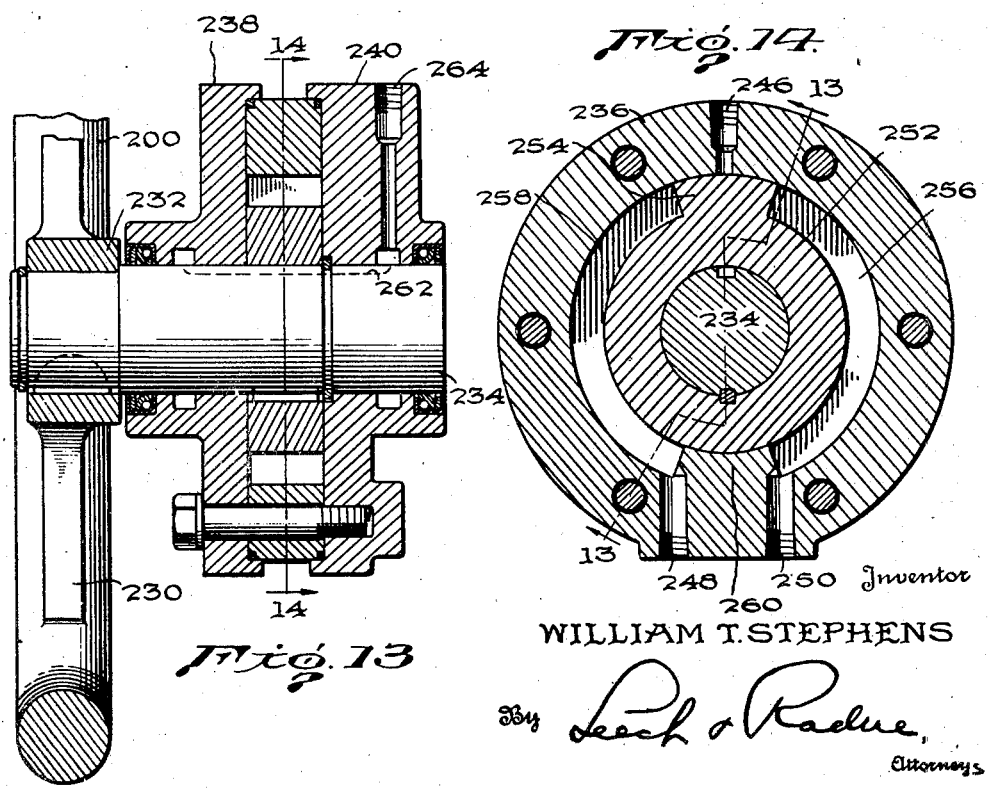

Patented Nov. 12, 1946

2,411,119

UNITED STATES PATENT OFFICE 2,411,119

STEERING MECHANISM

William T. Stephens, Cleveland, Ohio, assignor to Hydraulic Control Engineering Company, Cleveland, Ohio, a corporation of Ohio Application May 18, 1943, Serial No. 487,518

10 Claims. (Cl. 121—41)

This invention relates to a hydraulically operated steering mechanism, and more particularly to a hydraulic steering apparatus for use on automotive vehicles, aircraft and boats, wherein a conventional steering wheel is turned and a hydraulic motor energized by the wheel for moving the steering apparatus. A modification of the invention includes a dual steering apparatus whereby the vehicle may be additionally steered from a remote point.

An object of the invention is to construct a compact and easily manufactured steering apparatus in which the hydraulic motor circuit for operating the steering arm is of the closed system type.

Another object of the invention is the utilization of a conventional steering wheel having a steering column provided with hydraulic fluid passages and ports for operating an expansive chamber rotary piston motor directly coupled with the steering shaft whereby the steering wheel is turned to permit high pressure fluid to enter the valves and energize the steering motor.

A still further object of the invention is the novel hydraulic follow-up mechanism used whereby when the steering wheel is turned to initially register the power ports of the fluid valve the fluid thereafter rotates the steering shaft through a hydraulic motor to provide follow-up and stop the flow of fluid.

An additional object of the invention comprises the unique arrangement of the valving means for controlling the return fluid from the motor whereby both return ports are normally slightly open when the wheel is in any released position whereby the normal castering action of the steering wheels will return then to the straight ahead position in exactly the same manner as happens in straight mechanical steering when the steering wheel is released.

A further object is the combination with the main steering apparatus of a remote control steering wheel whereby the vehicle may be guided from a remote point.

In the drawings Figs. 1 to 6, inclusive, illustrate the steering apparatus and steering wheel control, together with the fluid pressure system for operating a steering apparatus, while Figs. 7 to 14, inclusive, illustrate the modified form of apparatus where a duel control of the main steering wheel is provided.

In the drawings:

Fig. 3 is a side elevation partly in central longitudinal section taken on line 3—3 of Fig. 2, of the steering mechanism as a whole showing the steering wheel, integral reservoir and associated valves and steering motor;

Fig. 4 is a transverse section taken on line 4—4 of Fig. 3;

Fig. 5 is a transverse section taken on line 5—5 of Fig. 3;

Fig. 6 is a transverse section of the steering motor taken on line 6—6 of Fig. 3;

Fig. 7 is a partial longitudinal section taken on line 7—7 of Fig. 10, of the modified steering construction for use with a remote operator;

Fig. 8 is a transverse section taken on line 8—8 of Fig. 7;

Fig. 9 is a transverse section taken on line 9—9 of Fig. 7;

Fig. 10 is a transverse section taken on line 10—10 of Fig. 7 showing the remote controlled fluid motor;

Fig. 11 is a transverse section taken on line 11—11 of Fig. 7, illustrating the hydraulic steering motor for the dual steering mechanism;

Fig. 12 is a diagrammatic layout of the dual or auxiliary steering system showing the auxiliary wheel with its fluid conduits leading to the main steering apparatus;

Fig. 13 is a longitudinal central section of the remotely operated fluid valve, taken on broken line 13—13 of Fig. 14; and Fig. 14 is a transverse section of the remote operator taken on line 14—14 of Fig. 13.

Figure 1:
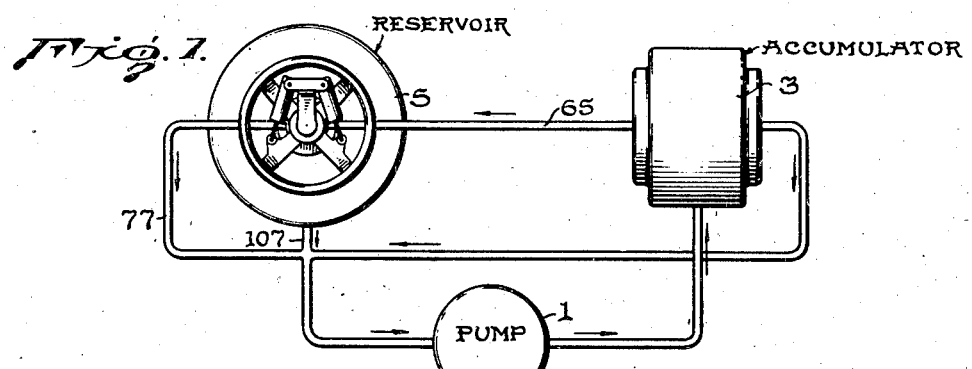
Fig. 1 is a diagrammatic layout of the closed fluid system.
Figure 2:
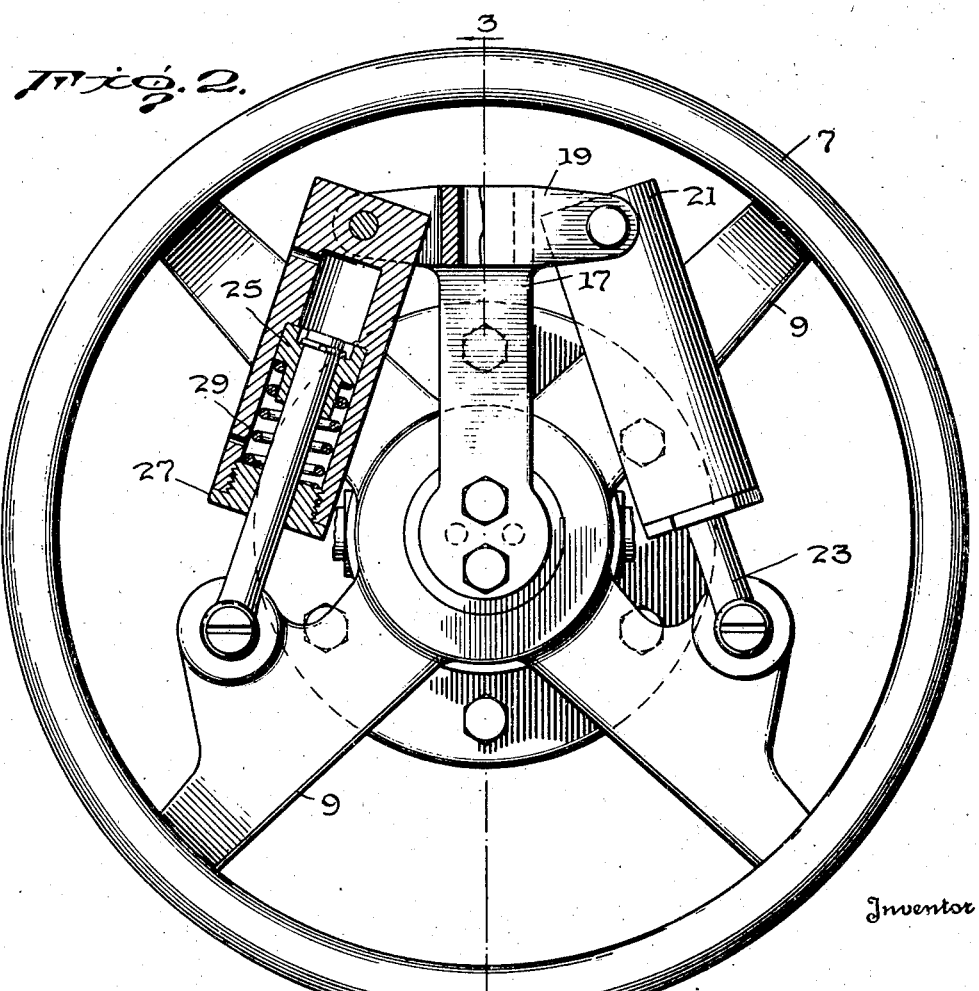
Fig. 2 is a plan view of the steering wheel with its associated return mechanism.

As shown in Fig. 1 of the drawings, the steering mechanism comprises a closed hydraulic system joined by suitable piping and includes a fluid pressure power driven pump 1 connected to an accumulator 3 and leading to the steering apparatus per se 5. The preferred embodiment of the steering gear comprises a manually rotatable steering wheel 7 provided with spokes 9 attached to a flanged cylinder 11 having an extended cylindrical skirt portion 13 surrounding the upper end of the centrally arranged steering shaft 15. The outer end of the rotatable shaft 15 is bolted to a radial arm 17 having a transverse extension 19 secured to the outer end thereof. Spring return cylinders 21 are pivoted to the outer ends of the transverse member 19 with each cylinder 21 provided with an outwardly extending piston rod 23 pivotally secured to an adjacent steering wheel spoke 9. The inner ends of the piston rods 23 are slidably recessed in close fitting bores in bushings 25 of the same diameter as and slidable in the major portion of the bores of the cylinders 21 and the ends of the cylinders through which the piston rods 23 pass are closed by screw blocks 27. Lying between the inner faces of the screw blocks 27 and the bushings 25 are compression springs 29. Reduced bores at the inner ends of the cylinders provide accommodation for the ends of the rods 23 when they slide through the bushings which are stopped by shoulders at the junctions of the cylinder bores. Snap rings on the inner ends of the rods engage and move the bushings when the rods are withdrawn from the positions as shown. It will be obvious that when the steering wheel 7 is turned one or the other of the springs 29 will be compressed and thereafter if the steering wheel is released the spring return mechanism will rotate the steering wheel in the opposite direction to that which it has been turned and thus return the steering wheel to a neutral position where steering action ceases.

The center steering shaft or column 15 extends throughout the length of the apparatus and terminates in a suitable steering arm 31 to which the device to be controlled may be suitably connected for imparting movement thereto.

Referring again to the shaft 15, it will be observed that the portion of the shaft adjacent the steering wheel is longitudinally bored to provide a pair of spaced parallel fluid passages 39 and 41. These spaced fluid bores 39 and 41 are connected with a plurality of radial passages which form the fluid control valve for this device, as will be hereinafter described. As before stated, the control valve section of the steering shaft 15 is encompassed within the cylindrical skirt 13 attached to the steering spokes 9 and surrounding the skirt 13 is a fixed cylindrical sleeve 35 having an end flange 43 abutting a centrally apertured plate 45. The plate 45 holds one end of a hydraulic motor casing 47 within an annular groove 49, while the opposite end of the motor casing 47 is similarly held by an apertured plate 50 and this whole assembly is bolted to the end of a reservoir or tank 51. The steering shaft 15 is suitably mounted in anti-friction bearings 53 positioned in the plates 45 and 50 with the outer end of the shaft passing through the end of the reservoir or casing 51 mounted in an antifrictional bearing 55. The end projection or shoulder 57 holding the bearing 55 is provided with suitable packing 59 to prevent the leakage of hydraulic fluid therefrom, and it will be understood that all other joints subjected to fluid pressure are also furnished with conventional packing means.

High pressure fluid from accumulator 3 flows through piping 65 to the inlet port 67, Fig. 5, and thence into the annular passage 69 formed in the inner face of cylindrical sleeve 35. This annular passage 69 communicates with oppositely positioned radial passages 71 and 73 formed in skirt 13 with the inner ends of the passages enlarged to form arcuate chambers adjacent the periphery of the steering shaft 15. The normal or neutral position of these connecting passages is shown in Fig. 5 of the drawings.

Adjacent the steering wheel end of sleeve 35 is the low pressure or discharge port 75, Fig. 4, joined by piping 77 leading back to the pump 1 or tank 51. Fluid pressure passing through longitudinal bores 39 and 41 from the high pressure valve section heretofore described will discharge into oppositely positioned discharge passages 79 or 81 through radial passages 100 or 101 and thence into annular passageway 83 formed in sleeve 35 whereby the fluid may flow outwardly through outlet 75.

The longitudinal bores 39 and 41 extend to the mid portion of the hydraulic expansive chamber rotary piston motor 47 shown in detail in Fig. 6. This motor comprises a sleeve 85 splined to the shaft 15 with a radial piston 87 formed on the sleeve for close working engagement with the inner wall of the motor housing 47. The sleeve 85 is of smaller diameter except through the piston portion than the inner diameter of the motor casing and the space defined therebetween forms fluid chambers 89 and 91 on opposite sides of the piston 87. The two chambers 91 and 89 are separated by piston 87 and by land 93 extending from housing 47. As shown, the longitudinal bores 39 and 41 continue radially by means of passages 95 and 97 respectively through shaft 15 and rotary sleeve 85 on opposite sides of the piston 87 to communicate with chambers 91 and 89.

Similarly, radial fluid passages 98 and 99 extend from bores 39 and 41 respectively in the high pressure fluid control valve section for controlling the flow of fluid from passages 71 and 73 connected to the annular passage 69 while in the low pressure exhaust section the bores 39 and 41 are radially extended through passages 100 and 101 respectively whereby low pressure fluid may be exhausted through passages 79 and 81 to annular passage 83 and thence through exhaust port 75.

The system is filled with hydraulic fluid by maintaining a supply of fluid in the enlarged chamber 51 that encompasses the lower end of the steering shaft 15. The hydraulic fluid may be introduced into the reservoir 51 through opening 103 while the fluid passes into the system through exit port 105 connected by pipe line 107 leading to the pump.

In operation, if the steering wheel 7 and its associated skirt 13 are rotated clockwise, fluid passages 73 and 79 will be brought into communication with passages 98 and 101 and as a result H. P. fluid will flow from H. P. inlet 67 through passages 69, 73, 98, 39 and 95 to chamber 91 where it acts to rotate steering motor members 85 and 87 in a clockwise direction. Since part 85 is securely fastened to steering shaft 15 this shaft and its associated arm 31 will also be revolved in a clockwise direction to accomplish steering. Simultaneous with the above, L. P. fluid will be caused to exhaust from chamber 89 to L. P. exit port 75 by means of passages 97, 41, 101, 79 and 83 while passages 99 and 100 are completely blocked by skirt 13, thus confining the movement of the fluid to the above described circuits. In a like manner if the steering wheel is rotated counter-clockwise, passages 73 and 81 are brought into communication with passages 99 and 100 and H. P. fluid will flow from inlet port 67 through passages 69, 73, 99, 41 and 97 to chamber 89 where it will act to rotate parts 85, 87, 15 and 31 in a counter-clockwise direction. L. P. fluid from chamber 91 will be exhausted back to L. P. outlet 75 via passages 95, 39, 100, 81 and 83. Skirt 13 now blocks passages 98 and 101 to confine the fluid flow to the circuits just described. Passage 71 diametrically opposite to passage 73, while not having any part in the hydraulic circuits just described, does have a very definite function in the assembly in that it forms the balancing means between shaft 15 and sleeve or skirt 13, thereby preventing binding between these two parts.

The enlarged portion of passage 73 does not quite span the distance between passages 98 and 99, hence wheel 7 and skirt 13 must be moved a slight amount in either direction from the neutral position shown before the H. P. circuit to motor chambers 89 or 91 is opened. It will also be noted that in the neutral position shown passages 79 and 81 are in communication with passages 101 and 100 respectively. The slight rotation required of wheel 7 before valving of the H. P. fluid occurs provides the play ordinarily found in a conventional type steering wheel and shaft. One purpose of this play is to prevent slight movements of said steering wheel from being transmitted to the vehicle wheels, thus preventing wandering. Play in the steering wheel also allows for slight movement of the vehicle wheels without corresponding movement of the steering wheel. Thus steering wheel flutter as a result of uneven terrain or road shock is eliminated. The overlapping of passages 79 and 101 and 81 and 100, along with the overtravel of wheel 7 as made possible by the arrangement of passages 73, 98 and 99 accomplishes this latter purpose in this invention. Road shock which would tend to cause movement of arm 31 and shaft 15 would also tend to rotate parts 85 and 87 of the steering motor. Such movement of parts 85 and 87 would cause fluid to be expelled from either chamber 89 or 91, and since these chambers are in communication with each other by means of passages 97, 41, 101, 79, 83, 81, 100, 39 and 95 fluid would be expelled from one or the other of said chambers and allowed to pass to the other. As a result, shaft 15 may rotate a limited amount without affecting the wheel 7. Any tendency of shaft 15 to rotate more than a limited amount as a result of road shock is counteracted when the shaft has moved enough to bring either passage 98 or 99 in communication with passage 73 thereby allowing H. P. fluid to enter either chamber 91 or 89 and oppose such movement.

The amount of relatively free movement of wheel 7 is governed by the stroke of the spring cylinders 21. This stroke is such that it only allows for enough free movement of skirt 13 to register passage 73 with either passage 98 or 99 to accomplish power steering. Further rotation of wheel 7 beyond the free movement point is possible but results in shaft 15 being moved by the wheel to accomplish manual steering. Since the physical effort required to steer the vehicle manually is much greater than for power steering, manual steering is reserved for emergency only and will be discussed later. The arrangement of cylinders 21 makes possible the same type of governed steering as would be had by means of a conventional steering wheel arrangement. Note that as soon as wheel 7 and skirt 13 have been revolved sufficiently to take up the overtravel or play, either passage 98 or 99 is brought into communication with passage 73 with resulting power steering, which results in rotation of shaft 15 in a direction which tends to shut off communication between the passages just brought into register. It should be apparent then that continued movement of wheel 7 to keep passage 73 in register with either passage 98 or 99 is required to maintain steering, for just as soon as movement of wheel 7 is stopped, shaft 15 will catch up, passage 98 or 99 will be taken out of register with passage 73 and steering will be stopped. This continued movement of wheel 7 to accomplish continued steering gives steering control similar to the conventional type.

After the desired amount of steering has been accomplished, wheel 7 may be reversed in direction with a resulting reversal of direction in steering which results in bringing the vehicle wheels back to their normal position. In conventional steering, if the operator lets go of the steering wheel the caster of the steered wheels returns them to their normal straight-forward position. This result is duplicated in the described assembly in the following manner. If the operator lets go of the steering wheel after the vehicle wheels have been turned, the depressed spring 29 of one of the cylinders 21 acts to return wheel 7 to its neutral position in relation to shaft 15. This shuts off circulation of the H. P. fluid to the steering motor and would result in the vehicle wheels remaining in their turned positions were it not for the caster which acts to return these wheels to their normal position. When this occurs arm 31, along with shaft 15, is returned to its neutral position carrying wheel 7 and skirt 13 along with it. This return to neutral is possible because of the arrangement of passages 79, 81, 100 and 101 which allows transference of liquid from one of the chambers 89 or 91 to the other when skirt 13 is in its neutral position in relation to shaft 15.

If the H. P. source of the hydraulic system should fail, the vehicle could still be steered manually, as noted previously. This is possible because of the arrangement of passages 79, 81, 100 and 101, which allows exhausting of the fluid in chambers 89 or 91 to L. P. when wheel 7, skirt 13, shaft 15 and motor parts 85 and 87 are rotated manually as a unit.

Since the above arrangement of passages eliminates the possibility of a hydraulic lock occurring in the steering motor and the arrangement of spring cylinders 21, steering wheel 7 and shaft 15 allows for coordinated movement between wheel 7 and shaft 15, it should be evident that emergency manual steering can be accomplished with only minor inconveniences, namely, more physical effort on the part of the operator and slightly more play or free movement of wheel 7 before actual steering is produced.

In the modified form of the invention disclosed in Figs. 7–14, inclusive, the apparatus as heretofore described is provided with an additional or dual steering wheel 200 located at some distant point. This remote operating wheel 200 is directly connected to an auxiliary motor operator illustrated in Figs. 13 and 14 of the drawings, whereby fluid is forced through a suitable piping system to an auxiliary steering wheel motor added to the master steering wheel control previously described.

Fig. 7 is an enlarged view of the modified main steering wheel which is identical to the form of steering apparatus shown in Fig. 3, with the exception that it is provided with an auxiliary or secondary remotely operated fluid motor 210. This auxiliary operating or steering wheel motor is positioned between the flanged cylinder 43 and the side plate 45 and comprises a side plate 212 abutting the valve side plate 45, with a cylindrical motor casing clamped between it and the flange 43 by the bolts which fasten the whole assembly to the fluid reservoir 51. As seen in Fig. 10 the cylindrical casing 210 of the secondary motor is provided with inlet and outlet passages 214 and 216, respectively, with the inner ends of these passages communicating with the two arcuate chambers 218 separated by the bottom abutment 220 integral with the casing intermediate the inlet and outlet passages 214 and 216.

The annular chamber is also divided by the piston 222 formed on a cylindrical member 224 which is keyed to the inwardly extending sleeve 13. This sleeve 13 while somewhat longer in length than the form shown in Fig. 3 is provided with radial passages and bores in a similar manner to the corresponding element of the preferred form of the invention shown in Figs. 3 to 6 inclusive. A suitable bleed plug 226 is provided extending through the remote motor casing 210 whereby the auxiliary system can be bled and maintained full of fluid. The steering wheel shaft operating motor illustrated in Fig. 11 is identical to the motor shown in Fig. 6 and its operation is similar.

Movement is imparted to movable abutment 222 of the auxiliary motor 210 by turning the auxiliary wheel 200 which is preferably located at some distant point. The wheel 200 is affixed to spokes 230 carried by a hub 232, which is keyed to rotary shaft 234. This shaft extends through a casing formed of a pair of spaced annular plates 238 and 240 bolted on opposite sides of a cylindrical housing member 236. The construction of this fluid operator or compressor is shown in Fig. 14. Fluid from tank 242 and controlled by valve 244 is led to the annular chambers 256 and 258 of the device through auxiliary operating device through inlet 246 and is discharged therefrom through ports 248 and 250. These inlet and outlet ports are connected by suitable piping to the inlet and outlet ports 214 and 216 of auxiliary steering wheel motor 210. A sleeve 252 is keyed on shaft 234 for rotation in the apertured central chamber 236 and provided with a radial piston 254 thereon whereby fluid in either of the side chambers 256 or 258 which are separated by abutment 260 will be forced through the inlet and outlet ports 248 and 250 when the shaft 234 is rotated. It will be obvious that when the auxiliary hand wheel 200 is rotated the fluid lying between the piston 254 and either outlet 248 or 250 will be forced to flow to the auxiliary steering wheel operating motor 210 where the said fluid will give a corresponding rotation to radial abutment 222 of the auxiliary steering wheel motor 210 and thus move valve sleeve 13 for admission of the main fluid pressure into the steering apparatus to complete its normal operation. Fluid from the opposite side of the steering wheel motor is also returned by the return line to the opposite side of the fluid operator or compressor and any seepage in the auxiliary wheel motor will collect in groove 262 formed in the shaft 234 and flow back to the tank 242 through port 264 and its associated piping.

Thus when remote hand wheel 200 is turned in either direction the radial piston 254 will force fluid in the segmental annular chambers 256 or 258 through the discharge passages 248 or 250 and thence by the communicating piping to the secondary motor casing through ports 214 or 216 and moves the piston 222 clockwise or counter-clockwise as the case may be. Simultaneously fluid is forced from the opposite side of piston 222 to the opposite side of piston 254. It is thus evident that any movement of wheel 200 will cause piston 254 to move and produce a like movement of piston 222, which in turn, by means of its keyed association with sleeve 13, produces a like and similar movement of wheel 7 to accomplish power steering as previously noted. It is also apparent that so long as the independent hydraulic system consisting of the operator unit, steering wheel motor unit 210 and their connecting piping remain operative, the vehicle may be steered by remote control wheel 200. This holds true for either power steering or manual steering, since steering wheel motor 210 provides but one of two ways of rotating wheel 7 and its associated skirt 13, the other means being the conventional one of hand rotation as noted previously.

When this latter or remote control unit is provided and steering is done in the conventional manner by using wheel 7, the steering wheel motor 210 is naturally rotated as wheel 7 is rotated and thus motor 210 becomes the operator unit of the independent hydraulic system and is the means of operating piston 254, which in turn rotates wheel 200. In a vehicle of the type using this remote control the idle rotation of the remote wheel under normal steering conditions would not present any difficulties. Movement of the secondary motor abutment 222 rotates the shaft 15 and its associated valve skirt 13 to accomplish steering as heretofore described.

I claim:

1. A hydraulic steering gear comprising a steering shaft, a rotary piston hydraulic motor secured around said shaft, a hand wheel, said hand wheel carrying a valve sleeve concentrically mounted around one end of said shaft, resilient means connecting said hand wheel and shaft, passages leading to and from a source of hydraulic fluid formed in said valve sleeve, longitudinal bores in said shaft in communication with said motor, radial ports extending from said bores for communication with the passages leading from the source of hydraulic fluid and normally out of communication therewith whereby movement of said hand wheel and valve sleeve controls the flow of hydraulic fluid to and from said motor to move said steering shaft an equivalent distance and in the same direction as said hand wheel.

2. A hydraulic steering gear comprising a steering shaft, a hydraulic motor of the rotary piston type secured to said shaft for turning the same, hydraulic fluid inlet and exhaust passages and ports in said shaft for the flow of hydraulic fluid for the motor, an inner valve sleeve encompassing the portion of said shaft provided with said fluid ports, a hand wheel connected to said valve sleeve for rotating the same, a rigidly secured outer sleeve overlying said inner valve sleeve, a second rotary piston motor, means connecting the rotary portion of said second motor to said inner valve sleeve, a remotely positioned independent fluid transmitter, means to manually actuate said transmitter and a separate hydraulic fluid system connecting the said second rotary piston motor to the said independent transmitter.

3. A hydraulic steering gear comprising a tubular fluid reservoir, bearings fixed in the ends of said reservoir for supporting a rotary steering shaft extending therethrough, a hand wheel connected through a lost motion connection to one end of said shaft and a steering arm on the opposite end thereof, a fluid motor having a rotary piston encompassing said shaft secured to said reservoir adjacent the said hand wheel, a valved sleeve overlying the said shaft and rotatable with the said hand wheel, cooperating fluid passages formed in said shaft and sleeve whereby fluid under pressure is introduced into said motor for positively rotating said motor piston when said hand wheel is rotated.

4. A hydraulic steering gear as defined in claim 3 wherein initial movement of said hand wheel aligns the fluid passages in said valved sleeve and shaft whereby hydraulic fluid is introduced into said motor on one side of said rotary piston and exhausted from the opposite side thereof and said piston is rotated a degree corresponding to the initial movement of said hand wheel.

5. A hydraulic steering gear comprising a rotatably mounted steering shaft, a rotary hydraulic motor having a movable element secured to said shaft, a hand wheel, a valve sleeve movable by said wheel and having a close working fit on said shaft, a resilient coupling between said wheel and said shaft, means to deliver high pressure fluid to and withdraw low pressure fluid from said sleeve, radial passages in said sleeve separately connected to said means, two longitudinal bores in said shaft leading to the said motor element, and two radial ports connected to each bore, said sleeve passages each being positioned for selective cooperation with said ports.

6. A hydraulic steering gear comprising a rotatably mounted steering shaft, a rotary hydraulic motor having a movable element secured to said shaft, a hand wheel, a valve sleeve movable by said wheel and having a close working fit on said shaft, a resilient coupling between said wheel and said shaft, means to deliver high pressure fluid to and withdraw low pressure fluid from said sleeve, a radial passage in said sleeve connected to the high pressure fluid means, two longitudinal bores in said shaft leading to said motor, spaced radial ports connecting said bores to the shaft surface and spanning but normally out of cooperation with said passage and means to exhaust fluid from the motor.

7. A hydraulic steering gear comprising a rotatably mounted steering shaft, a rotary hydraulic motor having a movable element secured to said shaft, a hand wheel, a valve sleeve movable by said wheel and having a close working fit on said shaft, a resilient coupling between said wheel and said shaft, means to deliver high pressure fluid to and withdraw low pressure fluid from said sleeve, a radial passage in said sleeve connected to the high pressure fluid means, two longitudinal bores in said shaft leading to said motor, spaced radial ports connecting said bores to the shaft surface and spanning but normally out of cooperation with said passage, a second pair of spaced ports for said bores, said sleeve having two radial passages connected to the fluid withdrawal means and each normally having a slight overlap with one of said last mentioned ports.

8. The hydraulic steering gear combination as defined in claim 7 wherein the movement of the wheel in either direction causes overlap of said first mentioned radial passage with one of the first mentioned radial ports, and the separation of the corresponding one of the second mentioned radial passages from its cooperating port.

9. The hydraulic steering gear as defined in claim 5, wherein a second hydraulic motor is provided having a fixed housing and a rotor, said rotor surrounding and fixed to said valve sleeve, a remote hand wheel, a hydraulic transmitter operable by said remote hand wheel and hydraulic closed circuit connections between said second motor and said transmitter.

10. The hydraulic steering gear as defined in claim 7 wherein a second or remote hand wheel is provided, a pair of similar pump-motors, a pair of pipes connecting said pump motors for conducting hydraulic fluid between them whereby either may act as a pump to actuate the other as a motor, each pump-motor having a rotor, one of said rotors being secured to said second hand wheel and the other being secured to said valve sleeve.

WILLIAM T. STEPHENS.